United States Patent
Panabaker et al.

(10) Patent No.: US 7,840,237 B2
(45) Date of Patent: Nov. 23, 2010

(54) ENABLING USER INTERFACE ELEMENTS BASED ON SHORT RANGE WIRELESS DEVICES

(75) Inventors: Ruston Panabaker, Bellevue, WA (US); Pasquale DeMaio, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 11/704,130

(22) Filed: Feb. 8, 2007

(65) Prior Publication Data
US 2008/0194298 A1 Aug. 14, 2008

(51) Int. Cl.
*H04Q 7/20* (2006.01)
(52) U.S. Cl. ............... 455/566; 455/550.1; 455/41.1; 455/41.2; 455/41.3; 455/456.1; 235/379; 345/156; 345/157; 345/158
(58) Field of Classification Search ............... 455/566, 455/550.1, 41.1, 41.2, 41.3, 558, 412.1, 412.2, 455/456.1–457, 418–420, 426.1, 426.2; 235/379; 345/156, 157, 158
See application file for complete search history.

(56) References Cited
U.S. PATENT DOCUMENTS

| | | | |
|---|---|---|---|
| 2003/0095521 A1 | 5/2003 | Haller et al. | |
| 2004/0106408 A1 | 6/2004 | Beasley et al. | |
| 2006/0040692 A1 | 2/2006 | Anttila et al. | |
| 2006/0079247 A1* | 4/2006 | Ritter | 455/456.1 |
| 2006/0148404 A1 | 7/2006 | Wakim | |
| 2006/0159158 A1 | 7/2006 | Moore et al. | |
| 2006/0183462 A1 | 8/2006 | Kolehmainen | |
| 2006/0208066 A1 | 9/2006 | Finn et al. | |
| 2006/0223536 A1 | 10/2006 | Chia | |
| 2007/0275735 A1* | 11/2007 | Estevez | 455/457 |
| 2008/0093447 A1* | 4/2008 | Johnson et al. | 235/383 |
| 2009/0088077 A1* | 4/2009 | Brown et al. | 455/41.2 |

FOREIGN PATENT DOCUMENTS

| | | |
|---|---|---|
| WO | WO2006027725 A1 | 3/2006 |
| WO | WO200605246 A1 | 8/2006 |
| WO | WO2006095212 A1 | 9/2006 |
| WO | WO2006114287 A1 | 11/2006 |

OTHER PUBLICATIONS

"Near field communication (NFC) Ecma TC32-TG19, Jun. 2004", http://www.ecma-international.org/activities/Communications/2004ga-067.pdfa-067.pdf.

(Continued)

*Primary Examiner*—Keith T Ferguson (57) ABSTRACT

A system and method for enabling user interface elements to be displayed on a display device is disclosed. The technology includes a method for enabling user interface elements to be displayed on a display device. The method includes accessing location information corresponding to a first short range wireless device coupled with the display device wherein the location information identifies the location of the first short range wireless device with respect to a viewing surface of the display device. The method also includes enabling a first contactless user interface icon to be displayed on the viewing surface of the display device wherein the contactless user interface icon is displayed on the viewing surface proximate the location of the first short range wireless device.

20 Claims, 5 Drawing Sheets

OTHER PUBLICATIONS

Blau John, "Near Field Communication Goes Commercial", Date: Apr. 19, 2006, http://www.infoworld.com/article/06/04/19/77569_HNnfccommercial_1.html.

Chen, et al.,"Short-Range Wireless Technologies with Mobile Payments Systems", Date : 2004, http://delivery.acm.org/10.1145/1060000/1052302/p649-chen.pdf?key1=1052302&key2=8747185611&coll=GUIDE&dl=GUIDE&CFID=8588673&CFTOKEN=65093000.

Ortiz Sixto, "Is Near-Field Communication Close to Success?", Date: Mar. 2006, http://ieeexplore.ieee.org/iel5/2/33768/01607943.pdf?isnumber=&arnumber=1607943.

* cited by examiner

0
ENABLING USER INTERFACE ELEMENTS BASED ON SHORT RANGE WIRELESS DEVICES

BACKGROUND

Wireless communication technologies allow connectivity between a wide range of computing and telecommunications devices easily and simply, without the need to physically connect the communicating devices. These technologies deliver opportunities for rapid connections, and the possibility of automatic connections between devices.

One such connectivity technology is short range wireless communication. Products with built-in short range wireless communication simplify the way consumer devices interact with one another. In doing so, short range wireless communication systems help people speed connections, receive and share information, and even authenticate users.

For example, many public transportation systems such as trains and busses use short range wireless communication to automatically collect ride fares from riders. A person having a ride pass equipped with a short range wireless communication payment device can simply swipe the card past a card reader without having to use cash to pay. The card reader recognizes an identifying short range wireless device in the ride pass and automatically bills the customer associated with the identified short range wireless device.

Another example of short range wireless communications is Near Field Communication (NFC). NFC provides intuitive, simple, and safe communication between electronic devices. Communication between two NFC-compatible devices occurs when they are brought within a short distance of one another. Typically, the short distance is in the range of approximately less than 10 centimeters. For example, a simple swipe of an NFC-enabled card past a card reader can establish an NFC connection. NFC can also be integrated into other electronic devices such as cellular phones or NFC-enabled cards.

The various technologies for establishing wireless communication can lead to complications with user interaction with wireless devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for enabling user interface elements to be displayed on a display device is disclosed. The technology includes a method for enabling user interface elements to be displayed on a display device. The method includes accessing location information corresponding to a first short range wireless device coupled with the display device wherein the location information identifies the location of the first short range wireless device with respect to a viewing surface of the display device. The method also includes enabling a first contactless user interface icon to be displayed on the viewing surface of the display device wherein the contactless user interface icon is displayed on the viewing surface proximate the location of the first short range wireless device.

In order to facilitate enabling a user interface icon to be displayed on the viewing surface of the display device, a near field communication controller module accesses location information corresponding to a first short range wireless device coupled with a display device wherein the location information identifies where the first short range wireless device is positioned with respect to a viewing surface the display device. The near field communication controller then enables the first contactless user interface icon to be displayed on the viewing surface of the display device such that the first contactless user interface icon is displayed proximate the first short range wireless device.

DESCRIPTION OF THE DRAWINGS

The accompanying drawings, which are incorporated in and form a part of this specification, illustrate embodiments of the technology for enabling user interface elements to be displayed on a display device and, together with the description, serve to explain principles discussed below.

The drawings referred to in this description should be understood as not being drawn to scale except if specifically noted.

DETAILED DESCRIPTION

Reference will now be made in detail to embodiments of the present technology for enabling user interface icons to be displayed on a display device, examples of which are illustrated in the accompanying drawings. While the technology for enabling user interface elements to be displayed on a display device will be described in conjunction with various embodiments, it will be understood that they are not intended to limit the present technology for enabling user interface elements to be displayed on a display device to these embodiments. On the contrary, the presented technology for enabling user interface elements to be displayed on a display device is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for enabling user interface elements to be displayed on a display device. However, the present technology for enabling user interface elements to be displayed on a display device may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "enabling", "scrolling", "highlighting", "presenting", "configuring", "identifying", "reporting", "ensuring", "suppressing", "disabling", "ending", "providing", and "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for enabling user interface elements to be displayed on a display device is also well suited to the use of other computer systems such as, for example, optical and mechanical computers. Additionally, it should be understood that in embodiments of the present technology for enabling user interface elements to be displayed on a display device, one or more of the steps can be performed manually.

Example Computer System Environment

Figure 1:
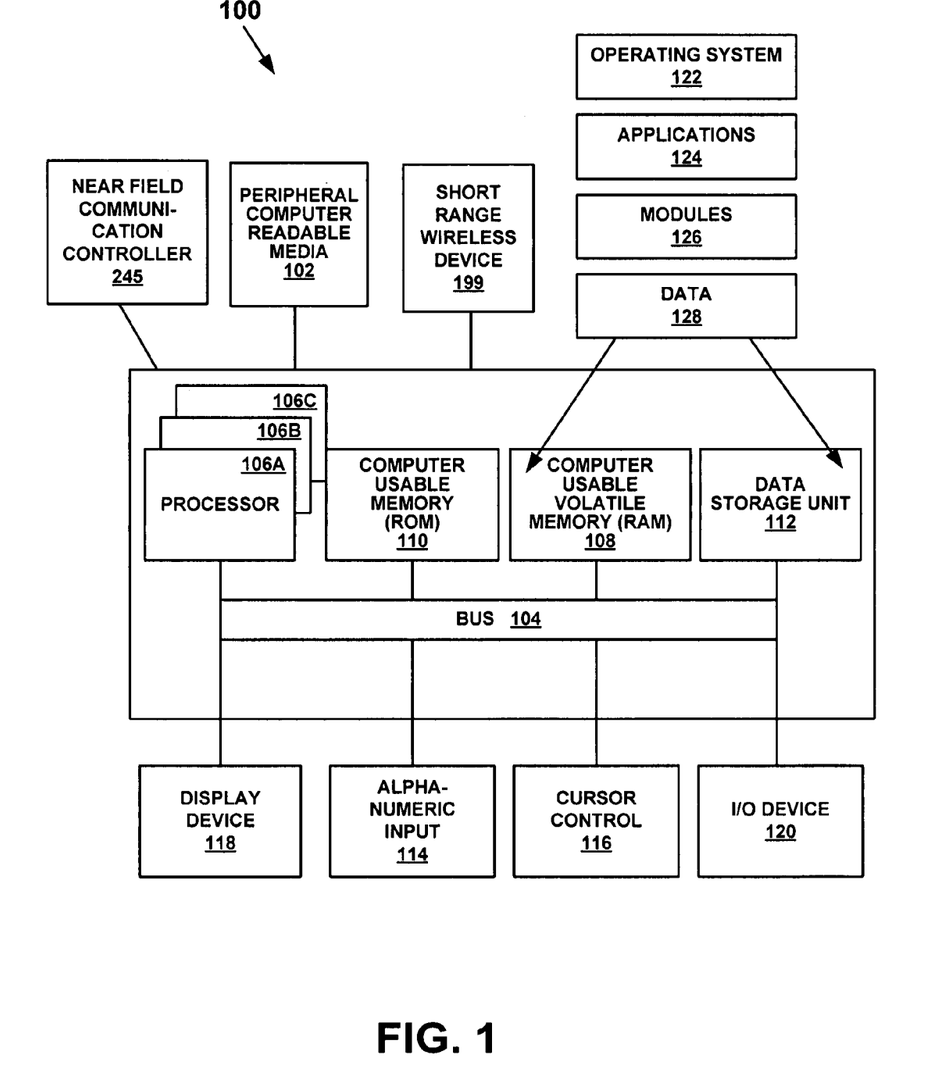
FIG. 1 is a diagram of an exemplary computer system used in accordance with embodiments of the present technology for enabling user interface elements to be displayed on a display device.

With reference now to FIG. 1, portions of the technology for enabling user interface elements to be displayed on a display device are composed of computer-readable and computer-executable instructions that reside, for example, in computer-usable media of a computer system. That is, FIG. 1 illustrates one example of a type of computer that can be used to implement embodiments, which are discussed below, of the present technology for enabling user interface elements to be displayed on a display device.

FIG. 1 illustrates an exemplary computer system 100 used in accordance with embodiments of the present technology enabling user interface elements to be displayed on a display device. It is appreciated that system 100 of FIG. 1 is exemplary only and that the present technology for enabling user interface elements to be displayed on a display device can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. System 100 may also include a short range wireless device 199. Short range wireless device 199 can be any type of short range wireless communication device, including a Near Field Communication (NFC) device. In one embodiment of the technology, short range wireless device 199 is coupled with display device 118. It is appreciated that any number of short range wireless devices may be coupled with display 118 and/or system 100 in accordance with embodiments of the present technology for enabling user interface elements to be displayed on a display device.

System 100 may also include or be coupled with a near field communication controller module 245. In one embodiment of the present technology for enabling user interface elements to be displayed on a display device, the near field communication controller 245 includes a near field device location determiner for determining the location of the short range wireless device 199 with respect to the viewing surface 129 of the display 118. In one embodiment of the present technology for enabling user interface elements to be displayed on a display device, the near field communication controller also includes a user interface enabler module for enabling a user interface element on the display 118 proximate the short range wireless device 199 coupled with display 118.

Optional cursor control device 116 allows the computer user to dynamically signal the movement of a visible symbol (cursor) on a viewing surface 129 of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for enabling user interface elements to be displayed on a display device is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for enabling user interface elements to be displayed on a display device, for example, is stored as an application 124 or module 126 in memory locations within RAM 108 and memory areas within data storage unit 112.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology is operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

Near Field Communication (NFC) devices can be integrated into many electronic devices such as cellular phones, cameras and MP3 players. NFC devices can also be integrated into other items such as debit or credit cards. NFC devices can facilitate transactions such as payments and data transfers.

In accordance with embodiments of the present technology for enabling user interface elements to be displayed on a display device, one or more short range wireless devices, such as NFC devices are integrated into a display device. For example, in one embodiment of the present technology, a short range wireless device is disposed behind the viewing surface of the display device. In this case, the short range wireless device may not be visible to a user.

For short range wireless communication to occur, the communicating devices must be in close proximity to each other. This requires a user to know where on the viewing surface of the display device to swipe their short range wireless device. To guide the user to the correct location on the viewing surface of the display device, a graphical user interface element is enabled to be displayed proximate the location on the viewing surface corresponding to where the short range wireless device is located behind the viewing surface of the display device.

Embodiments of the present technology can be used to provide user interface elements on a display device at specific locations of one or more NFC transceivers disposed behind the viewing surface of a display device. The present technology guides a user as to where to place a NFC-enabled card or device to accomplish an action such as unlocking a file, transferring data, voting, etc. In one embodiment, the present technology provides a visual feedback of wireless connectivity and/or allows selection of a software object using physical indication with a NFC or other short range wireless device. The present technology also provides an application program interface (API) for applications to know where on the viewing surface of the display to place user interface elements so that they are proximate the NFC transceiver in the display.

In one embodiment, the present technology provides a method and system for enabling user interface elements to be displayed on the viewing surface of a display device. For example, to guide a user to pass a NFC-enabled device past a particular part of the viewing surface of a display device, a contactless user interface is enabled to be displayed proximate a short range wireless device coupled with the display. In response to detecting the NFC-enabled device near the contactless user interface, an additional user interface element or user interface icon is enabled to be displayed. When the NFC-enabled device is no longer proximate the short range wireless device, the additional user interface element is disabled.

As an example, a user with an NFC-enabled debit card passes the card past a contactless user interface element displayed on the viewing surface of a display device with a compatible short range wireless device behind the viewing surface. With the NFC-enabled debit card in close proximity to the contactless user interface element, a Personal Identification Number (PIN) pad is displayed, allowing the user access to banking functions. When the NFC-enabled debit card is removed from the proximate location of the contactless user interface element, the PIN pad disappears.

For the short range wireless device integrated with the display device to detect the user, the user must pass the card in close proximity to the wireless communication device coupled with the display. One way of alerting the user where to swipe is with a user interface icon. Embodiments of the present technology alert a program or operating system where to place the user interface icons on a display device to facilitate establishment of short range wireless communication.

In one embodiment, a near field communication controller module is used to enable user interface elements to be displayed on a viewing surface of a display device proximate a near field communication device coupled behind the viewing surface of the display. More specifically, the near field communication controller module includes a near field communication device location determiner for determining the location of a near field communication device with respect to the viewing surface of a display device.

For example, in one embodiment, a near field communication device is located behind the viewing surface of the display device in the center of the viewing surface. In one embodiment the near field communication control module also includes a user interface enabler module for enabling a contactless user interface element proximate the location on the viewing surface of the display corresponding to the near field communication device.

For purposes of explaining the present technology, a display device having a short range wireless device behind the viewing surface is used as one example of a device for which embodiments of the present technology can be used. It is appreciated that embodiments of the present technology can be used in conjunction with many different configurations of display devices and short range wireless devices.

Architecture

Figure 2:
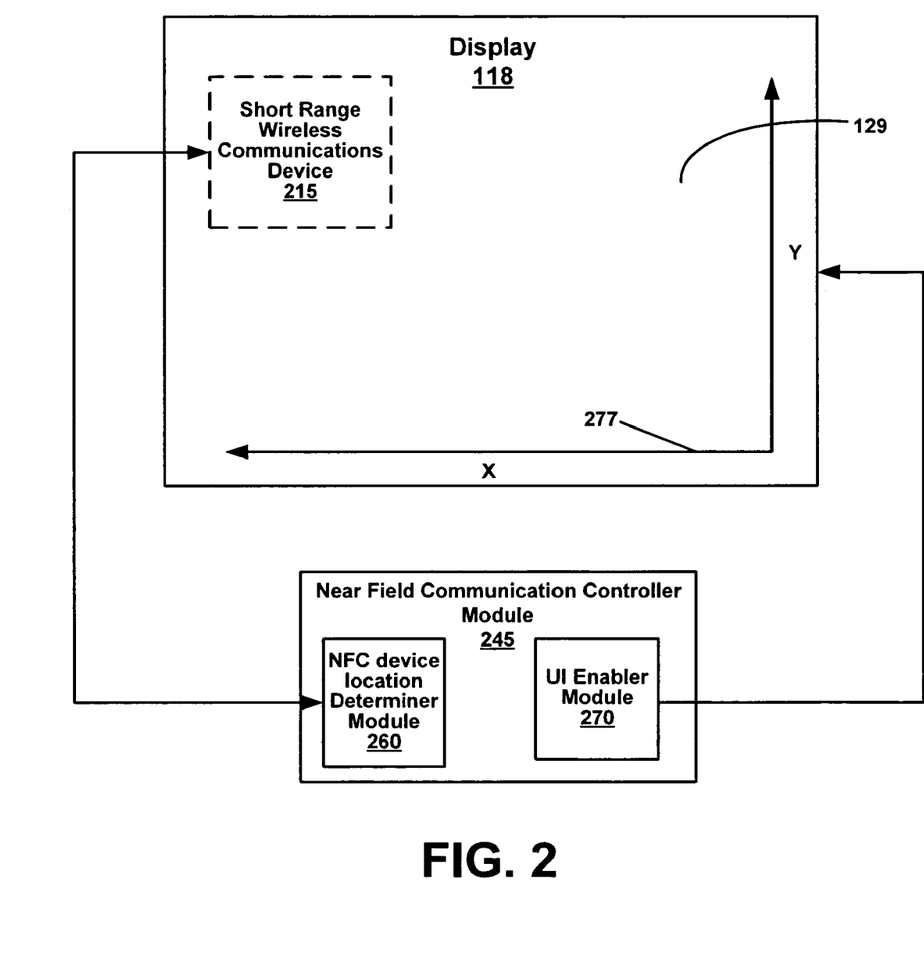
FIG. 2 is a diagram of an exemplary system for providing user interface elements on a display in accordance with embodiments of the present technology for enabling user interface elements to be displayed on a display device.

FIG. 2 is a diagram of an exemplary system 245 for enabling user interface elements to be displayed on a display device 118 in accordance with embodiments of the present technology.

Near Field Communication (NFC) is used as an example to facilitate the description of the present technology and it should not be interpreted that embodiments of the present technology are limited to NFC. However, it is appreciated that embodiments of the present technology for enabling user interface elements to be displayed on a display device can be used in conjunction with any number of short range wireless communication standards or protocols.

In one embodiment, a near field communication controller module 245 enables user interface elements to be displayed on a display device 118 proximate a short range wireless device 215. In this example, the short range wireless device 215, shown with dotted lines, is located behind the viewing surface 129 of the display device.

The near field communication control module 245 includes a near field communication device location determiner 260 for determining the location of the short range wireless device 215 with respect to the viewing surface 129 of the display 118. In one embodiment, the location information includes Cartesian coordinates 277 indicating where on the viewing surface of the display 118 the device resides. In another embodiment of the present technology, the location information includes pixel information indicating where on the viewing surface of the display device the short range wireless device 215 is located.

It is appreciated that the location information may be accessed directly from the short range wireless device 215. However, it is also appreciated that the location information may be accessed or determined in any number of ways. For example, the location information could be accessed from a memory device that includes the location information of the short range wireless device 215 with respect to the display device 118.

The near field communication controller module 245 further includes a user interface enabler module 270 for enabling a user interface icon or element to be displayed on the display device 118. In one embodiment, the user interface enabler module 270 enables a contactless user interface element to be displayed on the display device 118 proximate the location of the short range wireless device 215 coupled with the display device 118.

In one embodiment, the user interface enabler module generates and provides the user interface icon to the display device. However, in another embodiment, the user interface enabler module communicates with an operating system, program, routine, script, etc. to specify where on the display device 118 the contactless user interface element should be positioned. In this case, the user interface enabler module 270 does not actually generate the user interface element, but provides information necessary for another module to generate the user interface element.

Figure 3:
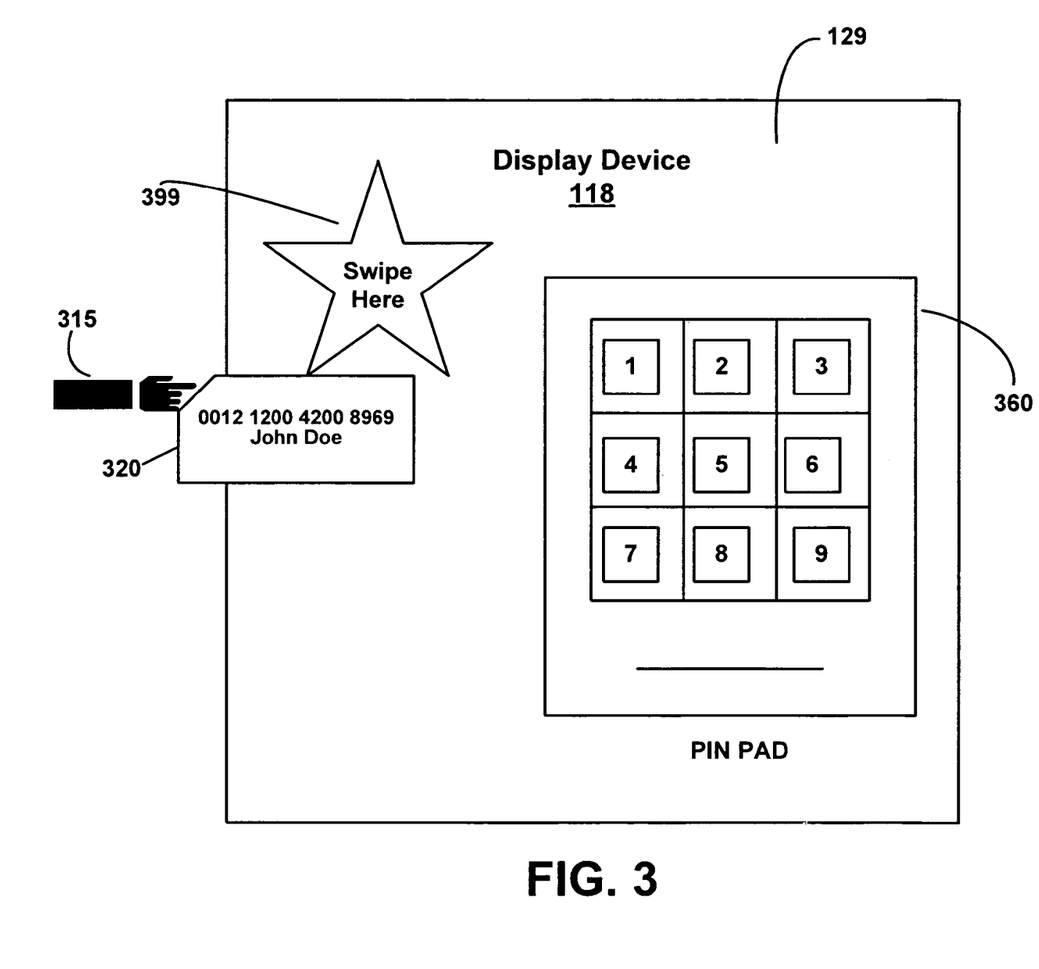
FIG. 3 is an illustration of an exemplary display with user interface elements proximate a short range wireless device in accordance with embodiments of the present technology for enabling user interface elements to be displayed on a display device.

FIG. 3 is an illustration of an exemplary display device 118 with user interface element 399 proximate a short range wireless device in accordance with embodiments of the present technology for enabling user interface elements to be displayed on a display device.

In this example, a user 315 swipes a NFC-enabled debit card 320 near a short range wireless device (hidden behind the viewing surface of the display device 118). In response, a PIN pad 360 is provided and debit operations are enabled. The contactless user interface element 399 directs where on the display device 118 the user 315 should swipe the NFC-enabled card 320 to initiate banking operations.

When the card 320 is removed from the user interface icon 399, the PIN pad 360 is removed from the display device and the banking session is terminated. Removing the PIN pad 360 provides a secure system wherein the functionality is disabled when the user is not in close proximity to the display device. As a result, the user can be certain that no one else will be accessing the user's personal information.

It is appreciated that embodiments of the present technology are not limited to enabling user interface elements. For example, embodiments of the present technology can be used to enable access to functionality, as described above in conjunction with FIG. 3. For example, embodiments of the present technology can be used to enable access to programs, make system calls to programs, enable access to services or any other actions that can be performed with short range wireless devices.

Figure 4:
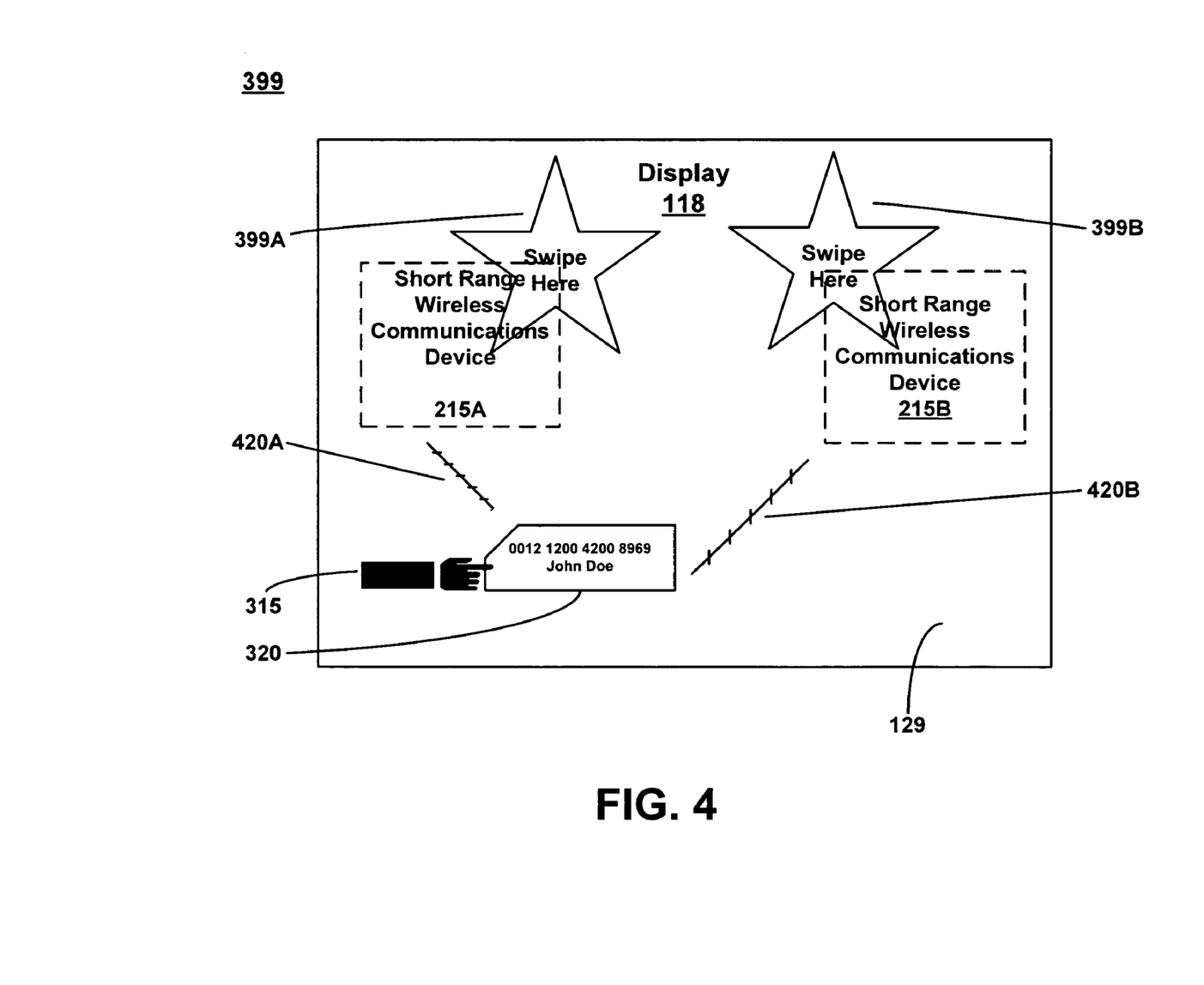
FIG. 4 is an illustration of an exemplary display with user interface elements proximate a plurality of short range wireless devices in accordance with embodiments of the present technology for enabling user interface elements to be displayed on a display device.

FIG. 4 is an illustration of an exemplary display device 118 with a user interface element 399A and 399B proximate a plurality of short range wireless devices 215A and 215B in accordance with embodiments of the present technology for enabling user interface elements to be displayed on a display device. The contactless user interface icons 399A and 399B alert the user 315 where to swipe the user's NFC-enabled device 320. In response to detecting the NFC-enabled device 320 at either one of the short range wireless devices 215A or 215B, an additional user interface icon is enabled to be displayed on the viewing surface 129 of the display device 118.

Having more than one short range wireless device (215A and 215B) allows more contactless user interface icons to be provided on the display device 118. In addition, the position of a NFC-enabled device 320 can be determined based in the signal strength 420A and 420B at each of the short range wireless devices 215.

Operation

Figure 5:
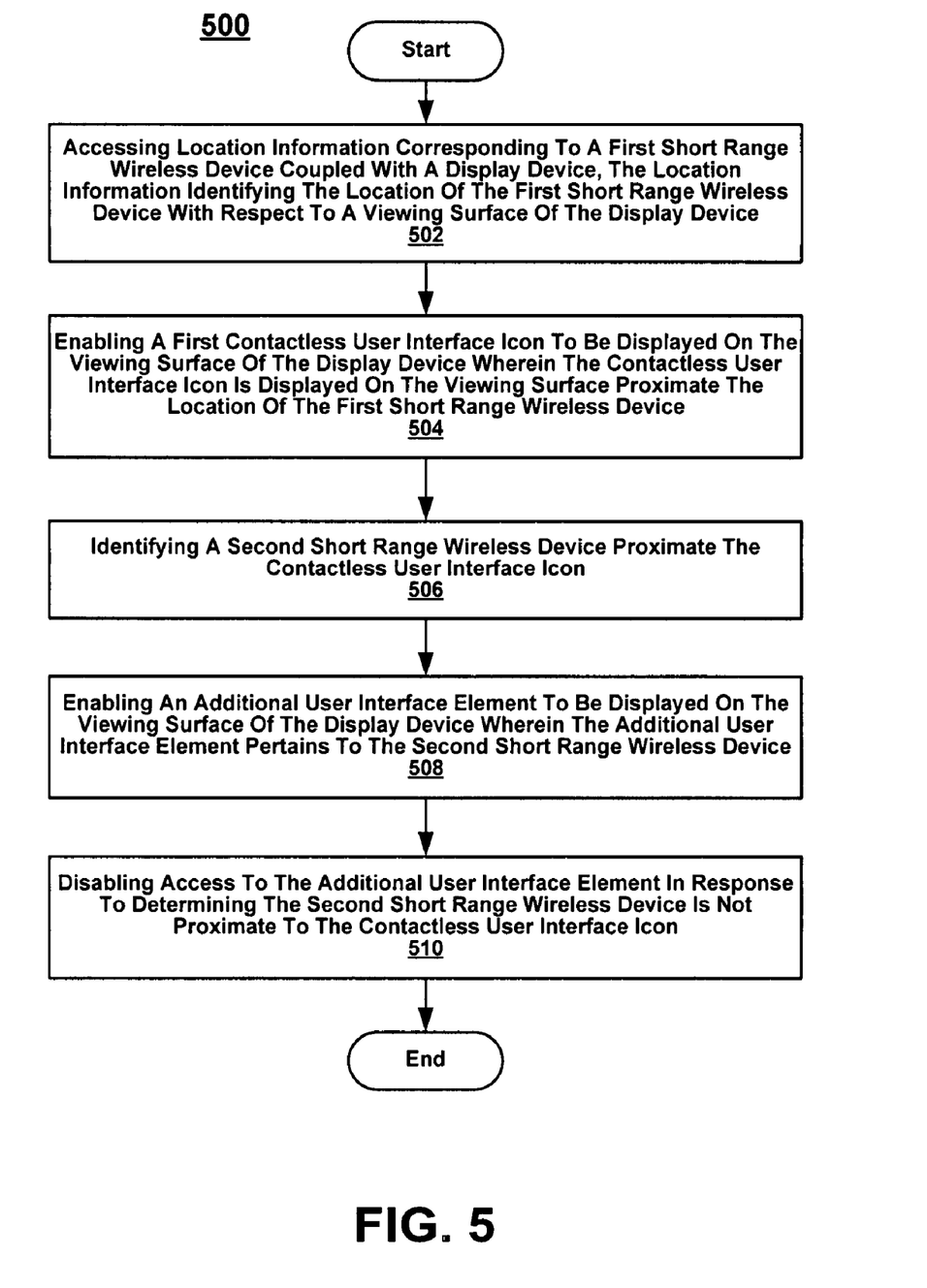
FIG. 5 is a flow diagram of an exemplary method for enabling user interface elements on a display device in accordance with embodiments of the present technology for enabling user interface elements to be displayed on a display device.

FIG. 5 is a flow diagram of an exemplary method 500 for enabling user interface icons in accordance with embodiments of the present technology for enabling user interface elements to be displayed on a display device.

At 502, method 500 includes accessing location information corresponding to a first short range wireless device coupled with a display device, the location information identifying the location of the first short range wireless device with respect to a viewing surface of the display device. In one embodiment, 502 includes communicating directly with the short range wireless device to determine the location information. In another embodiment, 502 includes retrieving the location information from another source such as a memory device.

At 504, method 500 includes enabling a first contactless user interface icon to be displayed on the viewing surface of the display device wherein the contactless user interface icon is displayed on the viewing surface proximate the location of the first short range wireless device. In one embodiment, the contactless user interface icon is positioned such that it at least partially overlaps the location at which the short range wireless device is coupled behind the viewable surface of the display device.

At 506 the present technology identifies a second short range wireless device proximate the contactless user interface icon. In one embodiment, the second short range wireless device is an NFC-enabled device that is swiped passed the contactless user interface icon enabled in 504.

In response to identifying the second short range wireless device, 508 includes enabling an additional user interface element to be displayed on the viewing surface of the display device wherein the additional user interface element pertains to the second short range wireless device. For example, as described above, in response to detecting a NFC-enabled debit card, a graphical PIN pad can be provided. It is appreciated that the additional user interface element enabled in 508 may be a contactless user interface element or a contact-based user interface element.

In one embodiment, the present technology performs a security check of the second short range wireless device prior to enabling the additional user interface element to be displayed on the viewing surface of the display device. For example, a hardware key exchange between the first short range wireless device and the second short range wireless device may be performed to establish an authenticated session or to determine security attributes of the second short range wireless device. If the authentication fails or the security attributers do not meet a threshold mlevel, the additional user interface element would not be enabled to be displayed on the viewing surface of the display device. It is appreciated that any number of methods and technologies for establishing a secure session could be used in conjunction with the present technology for enabling user interface icons on a display device.

It is further appreciated that the additional user interface element could be any kind of user interface element. For example, the additional user interface element may alert a user of a data transfer rate, a security level, currently achievable bandwidth, signal strength, user authentication, session timer, selection of services or objects, or any other kind of user interface.

At 510, method 500 includes disabling access to the additional user interface element in response to determining the second short range wireless device is not proximate to the contactless user interface icon. For example, when a user takes the NFC-enabled debit card away from the contactless user interface element enabled in 504, the PIN pad is disabled or removed from the display device. In one embodiment, removing the second short range wireless device from the contactless user interface icon ends a session and disables services that were accessible with the second short range wireless device proximate the contactless user interface icon.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
accessing location information corresponding to a first short range wireless device positioned at least partially behind a viewing surface of a display device, said location information identifying a location of said first short range wireless device with respect to the viewing surface of said display device;
enabling, based upon the location information, a first contactless user interface icon to be displayed on said viewing surface of said display device in front of or proximate to said location of said first short range wireless device such that the first contactless user interface icon indicates where a user can position another short range wireless device for communication with the first short range wireless device.

2. The method as recited in claim 1 further comprising:
generating the first contactless user interface icon on said viewing surface of said display device.

3. The method as recited in claim 1 further comprising:
identifying the another short range wireless device proximate to said first contactless user interface icon; and
enabling an additional user interface element to be displayed on said viewing surface of said display device wherein said additional user interface element pertains to said another short range wireless device.

4. The method as recited in claim 3 further comprising:
disabling access to said additional user interface element in response to determining said another short range wireless device is not proximate to said first contactless user interface icon.

5. The method as recited in claim 1 further comprising:
identifying the another short range wireless device proximate to said first contactless user interface icon; and
enabling a call to an operation based on said identifying of said another short range wireless device wherein said call pertains to said another short range wireless device.

6. The method as recited in claim 5 further comprising:
ending said operation in response to determining said another short range wireless device is not proximate to said first contactless user interface icon.

7. The method as recited in claim 1 further comprising:
determining a signal strength of the another short range wireless device proximate to said first contactless user interface icon; and
determining the location of said another short range wireless device with respect to said viewing surface of said display device based on said signal strength of said another short range wireless device.

8. The method as recited in claim 1 further comprising:
accessing location information corresponding to a second short range wireless device positioned at least partially behind the viewing surface of the display device, said location information identifying a location of said second short range wireless device with respect to the viewing surface of said display device; and,
enabling, based upon the location information, a second contactless user interface icon to be displayed on said viewing surface of said display device in front of or proximate to said location of said first short range wireless device such that the second contactless user interface icon indicates where the user can position the another short range wireless device for communication with the second short range wireless device.

9. The method as recited in claim 8, wherein the first and second short range wireless devices are positioned on an opposite side of the viewing surface relative to the another short range wireless device.

10. Instructions on a computer-usable medium wherein said instructions when executed cause a computer system to perform a method comprising:
accessing location information corresponding to first and second short range wireless devices coupled with a display device; and,
generating first and second contactless user interface icons to be displayed on a viewing surface of said display device, wherein the first and second contactless user interface icons indicate locations at which another short range wireless device can be read by at least one of the first or second short range wireless devices.

11. The instructions on a computer-usable medium as described in claim 10 wherein said method further comprises:

identifying the another short range wireless device proximate to one or both of said first and second contactless user interface icons; and performing a call to an operation based on said identifying, wherein said call pertains to said another short range wireless device.

12. The instructions on a computer-usable medium as described in claim 11 further comprising:

disabling said operation in response to determining said another short range wireless device is not proximate to at least one of said first or second contactless user interface icons.

13. The instructions on a computer-usable medium as described in claim 10 wherein said method further comprises:

determining a signal strength of the another short range wireless device proximate to at least one of said first and second contactless user interface icons; and determining a location of said another short range wireless device with respect to the viewing surface of said display device based on said signal strength of said another short range wireless device.

14. The instructions on a computer-usable medium as described in claim 10, wherein the first and second short range wireless devices are positioned on an opposite side of the viewing surface as the another short range wireless device during the reading.

15. A near field communication controller module comprising:

a near field communication device location determiner configured to access location information corresponding to a first short range wireless device coupled with a display device, said location information identifying where said first short range wireless device is positioned with respect to a viewing surface of said display device; and a user interface enabler module configured to enable a first contactless user interface icon to be displayed on said viewing surface of said display device such that said first contactless user interface icon is displayed proximate to said first short range wireless device to indicate where another short range wireless device can be positioned to be read by the first short range wireless device.

16. The near field communication controller module as described in claim 15 wherein said user interface enabler module is configured to enable an additional user interface element to be displayed on said viewing surface of said display device in response to determining the another short range wireless device is proximate to said first contactless user interface icon.

17. The near field communication controller module as described in claim 15 wherein said user interface enabler module is configured to enable a call to an operation in response to determining the another short range wireless device is proximate to said first contactless user interface icon.

18. The near field communication controller module as described in claim 17 wherein said user interface enabler module is configured to disabled said operation in response to determining said another short range wireless device is not proximate to said first contactless user interface icon.

19. The near field communication controller module as described in claim 15 further comprising:

a wireless signal strength module configured to determine a signal strength of the another short range wireless device proximate to said first contactless user interface icon, wherein a location of said another short range wireless device with respect to the viewing surface of said display device can be determined based on said signal strength of said another short range wireless device.

20. The near field communication controller module as described in claim 15 wherein said user interface enabler module is configured to enable an additional user interface element to be displayed on said viewing surface of said display device in response to determining a security attribute associated with the another short range wireless device proximate to said first contactless user interface icon.

* * * * *

UNITED STATES PATENT AND TRADEMARK OFFICE
CERTIFICATE OF CORRECTION

| | |
|---|---|
| PATENT NO. | : 7,840,237 B2 |
| APPLICATION NO. | : 11/704130 |
| DATED | : November 23, 2010 |
| INVENTOR(S) | : Ruston Panabaker et al. |

It is certified that error appears in the above-identified patent and that said Letters Patent is hereby corrected as shown below:

In column 12, line 19, in Claim 18, delete "disabled" and insert -- disable --, therefor.

Signed and Sealed this
Twenty-sixth Day of July, 2011

David J. Kappos
*Director of the United States Patent and Trademark Office*